(12) United States Patent
Strommer et al.

(10) Patent No.: US 8,238,625 B2
(45) Date of Patent: Aug. 7, 2012

(54) METHOD AND A SYSTEM FOR REGISTERING A 3D PRE ACQUIRED IMAGE COORDINATES SYSTEM WITH A MEDICAL POSITIONING SYSTEM COORDINATE SYSTEM AND WITH A 2D IMAGE COORDINATE SYSTEM

(75) Inventors: Gera Strommer, Haifa (IL); Uzi Eichler, Haifa (IL); Liat Schwartz, Haifa (IL)

(73) Assignee: MediGuide, Ltd., Haifa (IL)

( * ) Notice: Subject to any disclaimer, the term of this patent is extended or adjusted under 35 U.S.C. 154(b) by 1045 days.

(21) Appl. No.: 12/014,498

(22) Filed: Jan. 15, 2008

(65) Prior Publication Data

US 2008/0175463 A1 Jul. 24, 2008

Related U.S. Application Data

(60) Provisional application No. 60/880,877, filed on Jan. 17, 2007.

(51) Int. Cl.
*G06K 9/20* (2006.01)

(52) U.S. Cl. ........ 382/128; 382/130; 382/131; 382/190; 382/199; 607/1; 607/2; 600/1

(58) Field of Classification Search .................. 382/128, 382/130, 181, 190, 199; 607/1, 2; 600/1
See application file for complete search history.

(56) References Cited

U.S. PATENT DOCUMENTS 6,149,592 A 11/2000 Yanof et al.
(Continued)

FOREIGN PATENT DOCUMENTS

EP 1720039 11/2006

OTHER PUBLICATIONS

Lange, Thomas et al., "Augmenting Intraoperative 3D Ultrasound with Preoperative Models for Navigation in Liver Surgery", *H. Barillot & P. Hellier, Springer Verlag. Berlin Heldelberg, MICCAI, LNCS 3217* 2004, 534-541.

*Primary Examiner* — David A Vanore
*Assistant Examiner* — Nicole Ippolito
(74) *Attorney, Agent, or Firm* — Dykema Gossett PLLC

(57) ABSTRACT

A method for registering a three dimensional (3D) coordinates system with a Medical Positioning System (MPS) coordinate system and with a two dimensional (2D) coordinate system, includes acquiring at least one 2D image of a volume of interest, the volume of interest including at least one tubular organ within the body of a patient. The 2D image is associated with the 2D coordinate system, and a plurality of MPS points is acquired, within the at least one tubular organ. The MPS points are associated with the MPS coordinate system, the MPS coordinate system being registered with the 2D coordinate system. A 3D image model is extracted of the at least one tubular organ form a pre-acquired 3D image of the volume of interest. A volumetric model of the at least one tubular organ from the 2D image is estimated and from the acquired MPS points, the 3D coordinate system is registered with the MPS coordinate system and with the 2D coordinate system by matching the extracted 3D image model and the estimated volumetric model of the at least one tubular organ.

26 Claims, 7 Drawing Sheets

U.S. PATENT DOCUMENTS

| | | |
|---|---|---|
| 6,246,898 B1 | 6/2001 | Vesely et al. |
| 6,782,287 B2 | 8/2004 | Grzeszczuk et al. |
| 7,327,872 B2 | 2/2008 | Vaillant et al. |
| 2004/0138548 A1* | 7/2004 | Strommer et al. ............ 600/407 |
| 2005/0182319 A1 | 8/2005 | Glossop |
| 2006/0064006 A1 | 3/2006 | Strommer et al. |
| 2006/0079759 A1 | 4/2006 | Valliant et al. |
| 2006/0116575 A1 | 6/2006 | Willis |
| 2006/0253029 A1* | 11/2006 | Altmann et al. .............. 600/466 |
| 2006/0262970 A1 | 11/2006 | Boeses et al. |
| 2008/0152205 A1 | 6/2008 | Valliant et al. |
| 2011/0158488 A1* | 6/2011 | Cohen et al. .................. 382/128 |

\* cited by examiner

METHOD AND A SYSTEM FOR REGISTERING A 3D PRE ACQUIRED IMAGE COORDINATES SYSTEM WITH A MEDICAL POSITIONING SYSTEM COORDINATE SYSTEM AND WITH A 2D IMAGE COORDINATE SYSTEM

FIELD OF THE DISCLOSED TECHNIQUE

The disclosed technique relates to medical imaging and positioning systems in general, and in particular, to methods and systems for registering the coordinates of a three dimensional (3D) pre-acquired image with a Medical Positioning System (MPS), the MPS being registered with a two-dimensional (2D) real-time medical image.

BACKGROUND OF THE DISCLOSED TECHNIQUE

Superimposing a real-time representation of a medical device, such as a catheter or a biopsy needle, tracked by a Medical Positioning System (MPS), on a medical image such as Computer Tomography (CT), X-ray, Magnetic Resonance Imaging (MRI), Positron Emission Tomography (PET) and the like, during a medical procedure, is known in the art. This medical image serves as a map, aiding medical staff, performing a medical procedure, to navigate the medical device within a volume of interest in a body of a patient, subjected to this procedure. In order for that superposition to reflect the true position of the medical device within that volume of interest, it is required to register the coordinate system associated with the MPS with the coordinate system associated with the medical image.

U.S. Pat. No. 6,149,592 to Yanof et al, entitled "Integrated Flouroscopic Image Data, Volumetric Image Data, and Surgical Device Position Data" is directed to a system for integrating a CT scanner, fluoroscopic x-ray device and a mechanical arm type minimally invasive type surgical tool. In one embodiment, mechanical interconnections, between the CT scanner and the fluoroscopic device, provide a fixed and known offset there between. Mechanical interconnection between the surgical tool and the CT scanner measured by resolvers and encoders provide indication of the position and orientation of the surgical tool relative to the CT scanner. Because the fluoroscopic system is also mechanically constrained, the position and orientation of the surgical tool relative to the fluoroscopic system is also known.

In another embodiment, a plurality of transmitters, such as Light Emitting Diodes (LED), are mounted in a fixed and known relationship to the surgical tool or pointer. An array of receivers is mounted in a fixed relationship to the CT scanner. The surgical tool pointer is positioned on a plurality of markers, which are in a fixed relationship to the coordinate systems of the fluoroscopic scanner. Thus, the surgical tool coordinate system and the fluoroscopic scanner coordinate system are readily aligned.

U.S. Pat. No. 6,782,287 to Grzeszczuk et al, entitled "Method and Apparatus for Tracking a Medical Instrument Based on Image Registration" is directed to an apparatus, method and system for tracking a medical instrument, as it is moved in an operating space, by constructing a composite, 3-D rendition of at least a part of the operating space based on an algorithm that registers pre-operative 3-D diagnostic scans of the operating space with real-time, stereo x-ray or radiograph images of the operating space. An x-ray image intensifier, mounted on a C-arm, and the surgical instrument are equipped with emitters defining the local coordinate systems of each of them. The emitters may be LED markers which communicate with a tracking device or position sensor. The position sensor tracks these components within an operating space enabling the coordinate transformations between the various local coordinate systems. Image data acquired by the x-ray camera is used to register a pre-operative CT data set to a reference frame of a patient by taking at least two protocoled fluoroscopic views of the operating space, including a patient target site. These images are then used to compute the C-arm-to-CT registration. With the surgical tool being visible in at least two fluoroscopic views, the tool is then back-projected into the reference frame of the CT data set. The position and orientation of the tool can then be visualized with respect to a 3D image model of the region of interest. The surgical tool can also be tracked externally using the tracking device.

U.S. Pat. No. 6,246,898 to Vesely et al. entitled "Method for Carrying Out a Medical Procedure Using a Three-Dimensional Tracking and Imaging System", is directed to a system including a 3D tracking module, an imaging modality, a registration module, an instrument (e.g., catheter), reference transducers and mobile transducers. The transducers may be ultrasonic or electromagnetic transducers. The mobile transducers are coupled with the instrument and with the 3D tracking module. The registration module is coupled with the 3D tracking module and with the imaging modality. The 3D tracking module transforms the measurements of the transducers into XYZ coordinates relative to a reference axis, indicating the position of the instrument. A 3D image, representing the position, size and shape of the instrument, based on the 3D coordinates, is constructed. The imaging modality acquires 2D, 3D or 4D image data sets from an imaging source (e.g., MRI, CT, US). The registration module registers the position of the instrument with the spatial coordinates of the image data set by registering features in the image, such as the reference transducers, with their position in the measuring coordinate system (i.e., 3D tracking module coordinate system).

U.S. Patent application publication 2005/0182319 to Glossop entitled "Method and Apparatus for Registration, Verification, and Referencing of Internal Organs", is directed to a method for registering image information of an anatomical region (image space) with position information of a path within the anatomical region (patient space). One or more images of the anatomical region, are obtained (e.g., CT, PET, MRI). A three dimensional model of the anatomical region is constructed. The position information of the path within the anatomical region is obtained by inserting a registration device into a conduit, while a tracking device simultaneously samples the coordinates of the position indicating element coupled to the registration device. A three dimensional path ("centerline") of the registration device, in the anatomical region, is determined. The registration device includes at least one position indicating element (e.g., a coil that detects a magnetic field that is emitted by an electromagnetic tracking device). The image coordinate system is registered with the coordinate system of the tracking device, using the 3D image model and the 3D path of the registration device. Thus, it is possible to represent on the image, a graphical representation of an instrument, equipped with a position indicating element. However, in the method directed to by Glossop, there is no guarantee that the three dimensional path, obtained by the tracking device, is indeed the path of the center of the conduit. It may be that the tracking device traced a path close to the edges of the conduit or a sinusoidal path within the conduit. Therefore, the registration between the image coordinate system, with the coordinate system of the tracking device, may be rendered inaccurate.

U.S. Patent Application Publication 2006/0262970, to Boese et al, entitled "Method and Device for Registering 2D Projection Images Relative to a 3D Image Data Record" directs to a method for registering 2D projection images of an object relative to a 3D image data record of the same object. In the method to Boese et al, a pre-operative 3D data is recorded and a 3D feature (e.g., a model of a vessel tree) is extracted. The same 3D feature is recorded in at least two 2D fluoroscopy images from different C-arm angulations). A 3D symbolic reconstruction of the feature is determined from the two 2D fluoroscopy images. The coordinate systems of the 2D images and the 3D data are registered according to the reconstructed 2D feature from the 2D images and the extracted 3D feature from the 3D data.

SUMMARY OF THE PRESENT DISCLOSED TECHNIQUE

It is an object of the disclosed technique to provide a novel method and system for registering a three dimensional (3D) pre-acquired image coordinates system with a Medical Positioning System coordinate system and with a two dimensional (2D) image coordinate system.

In accordance with the disclosed technique, there is thus provided a method for registering a 3D pre-acquired image coordinates system with a MPS coordinate system and with a 2D image coordinate system. The method comprises the procedure of acquiring at least one 2D image of a volume of interest, acquiring a plurality of MPS points, within the at least one tubular organ, extracting a 3D image model of the at least one tubular organ, estimating a volumetric model of the at least one tubular organ and the 3D coordinate system with the MPS coordinate system and with the 2D coordinate system. The volume of interest includes at least one tubular organ. The 2D image is associated with the 2D coordinate system. The MPS points are associated with the MPS coordinate system. The MPS coordinate system is registered with the 2D coordinate system. The 3D image model is extracted form a pre-acquired 3D image of the volume of interest. The 3D image is associated with the 3D coordinate system. The volumetric model is estimated from the 2D image and the acquired MPS points. The 3D coordinate system is registered with the MPS coordinate system and with the 2D coordinate system by matching the extracted 3D image model and the estimated volumetric model of the tubular organ.

In accordance with another aspect of the disclosed technique, there is thus provided a system for registering a three dimensional (3D) pre-acquired image coordinates system with a Medical Positioning System (MPS) coordinate system and with a two dimensional (2D) image coordinate system. The system includes a medical imaging for acquiring at least one 2D image of a volume of interest, and a 3D medical images database for storing pre-acquired 3D images of the volume of interest. The 2D image is associated with the 2D coordinate system. The pre-acquired 3D images are associated with the 3D coordinate systems. The volume of interest includes at least one tubular organ. The system comprises an MPS and a coordinate system registration processor. The MPS is associated with the MPS coordinate system. The MPS coordinate system is registered with the 2D coordinate system. The MPS includes MPS transmitters and an MPS sensor for acquiring a plurality of MPS points within the at least one tubular organ. The coordinate systems registration processor is coupled with the MPS, with the medical imaging system and with the 3D medical images database. The coordinate systems registration processor extracts a 3D image model of the tubular organ estimates a volumetric model of the tubular organ and registers the 3D coordinate system with the MPS coordinate system and with the 2D coordinate. The coordinate systems registration processor extracts the 3D image model form the pre-acquired 3D image. The coordinate systems registration processor estimates the volumetric model according to the 2D image and the acquired MPS points and registers the 3D coordinate system with the MPS coordinate system and with the 2D coordinate by matching the extracted 3D image model and the estimated volumetric model of the tubular organ.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

Figure 1B:
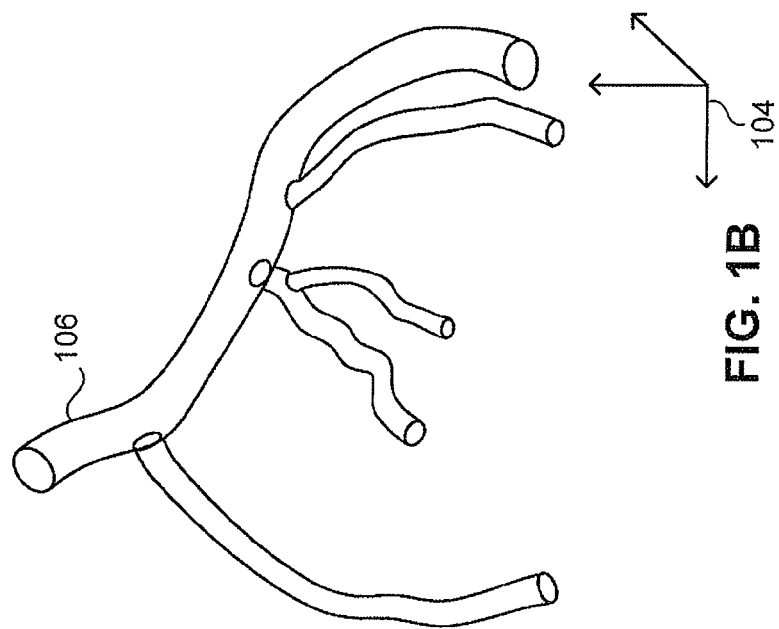
FIG. 1B is a schematic illustration of a 3D image model 106, of tubular organ 102, extracted from 3D pre-acquired image 100 (FIG. 1A)

The disclosed technique overcomes the disadvantages of the prior art by providing a method and a system for registering a coordinate system associated with a three dimensional (3D) pre-acquired medical image with a 3D coordinate system associated with an MPS and with a 2D coordinate system associated with a 2D image. The system, according to the disclosed technique, pre-acquires a 3D image of the volume of interest, and extracts a 3D image model of at least one tubular organ, within the volume of interest, from that 3D image (e.g., the coronary vessel of the heart). The system further obtains an estimated volumetric model of the same tubular organ. The system obtains this estimated volumetric model, using a trace of a medical device (i.e., a set of locations representing the trajectory of the medical device), which is inserted into the tubular organ, and at least one 2D image of that same organ. The medical device is fitted with an MPS sensor. The system uses these models to register the above mentioned coordinate systems, thus achieving registration with a higher degree of accuracy.

The coordinate system associated with the 3D pre-acquired image will be referred to herein as 3D coordinate system. The coordinate system associated with the 2D image will be referred to herein as 2D coordinate system. The coordinate system associated with the MPS will be referred to herein as MPS coordinate system. It is noted that the MPS coordinate system is a 3D coordinate system. The term "registration" refers to finding a transformation associating the coordinates of each point in one coordinate system to the coordinates of the same point in another coordinate system. The terms "trace" and "centerline", both refer herein to a set of locations representing the trajectory of the medical device.

A 3D pre-acquired image (e.g., CT, MRI, PET, 3D Ultra Sound) of a volume of interest can serve as a 3D reference road-map for navigating a minimal invasive medical device, such as a catheter, in that volume. Superimposing a minimal invasive medical device, operative in an MPS coordinate system and fitted with an MPS sensor, on the 3D pre-acquired image, requires registering the 3D coordinate system with the MPS coordinate system.

To achieve the registration, prior to a medical procedure, the system according to the disclosed technique, processes (e.g., segments) the 3D pre-acquired image and extracts a 3D model of a tubular organ. The tubular organ is situated within the imaged volume of interest. During a medical procedure (e.g., minimal invasive procedure), the medical staff inserts a medical device, fitted with an MPS sensor, into the tubular organ. An MPS acquires a plurality of MPS points (i.e., a plurality of locations of the MPS sensor within and along the tubular organ), and determines a 3D MPS trace of the shape of the same tubular organ. These MPS points are represented by coordinates in the MPS coordinate system.

When the medical staff inserts the medical device fitted with an MPS sensor into the tubular organ, the system obtains a 2D real-time image (e.g., X-ray, 2D Ultra Sound) of that organ. The MPS coordinate system is registered with the 2D coordinate system (e.g., by mechanically coupling the MPS transmitters to the imager). Using the 3D MPS trace and at least one 2D image, the system estimates a volumetric model of the tubular organ, and registers the MPS coordinate system and the 3D coordinate system by matching the extracted image model with the estimated volumetric model. The system achieves this registration with a high degree of accuracy, (i.e., since a volumetric model represents the tubular organ with a high degree of accuracy, than a simple trace of the trajectory of the MPS sensor within the tubular organ). Since the 2D coordinate system is registered with the MPS coordinate system, and the MPS coordinate system is registered with the 3D coordinate system, the 2D coordinate system is also registered with the 3D coordinate system.

During the medical procedure, the position and orientation of a patient might change. Consequently, the 2D real-time representation of the volume of interest may also change. These changes may affect the registration between the 3D coordinate system and the 2D coordinate system. Therefore, an MPS reference sensor, placed on the patient during the medical procedure, is operative to detect these changes in the patient position and orientation. The information about these changes may be used either for triggering a registration process or as input for such a registration process.

Figure 1A:
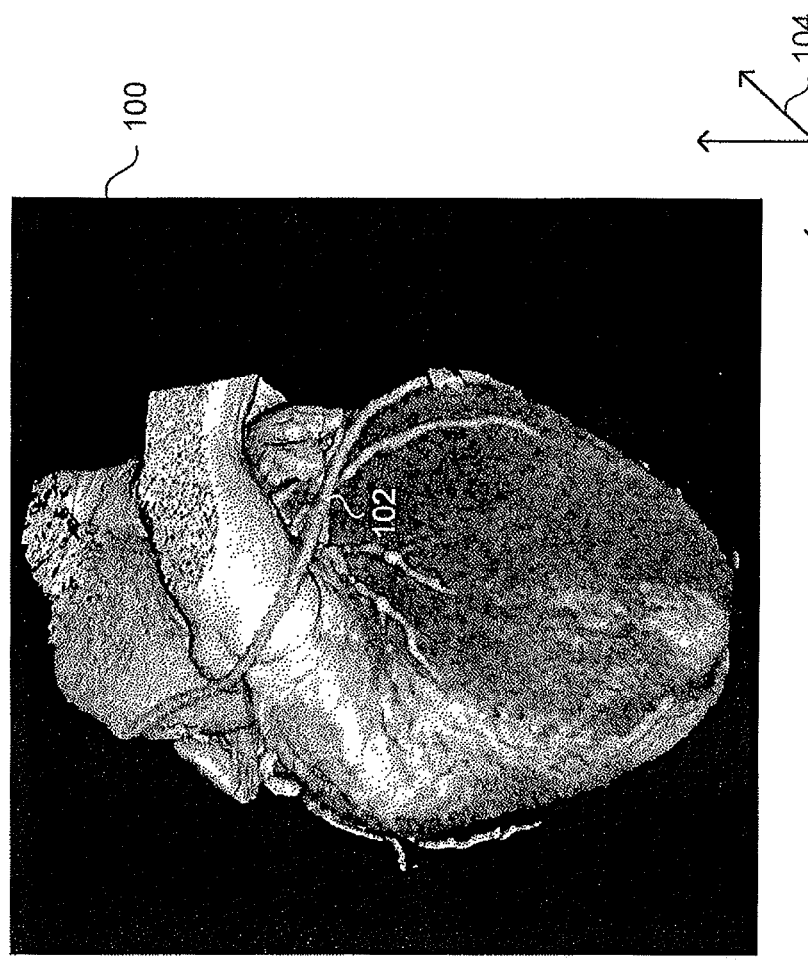
FIG. 1A is a schematic illustration of a 3D pre-acquired image 100 associated with a 3D coordinate system 104 in accordance with the disclosed technique.

Reference is now made to FIG. 1A and to FIG. 1B. FIG. 1A is a schematic illustration of a 3D pre-acquired image 100 associated with a 3D coordinate system 104 in accordance with the disclosed technique. Image 100 is a 3D image of a volume of interest which includes tubular organ 102. FIG. 1B is a schematic illustration of a 3D image model 106, of tubular organ 102, extracted from 3D pre-acquired image 100 (FIG. 1A). Extracted image model 106 is also associated with 3D coordinate system 104.

Figure 2B:
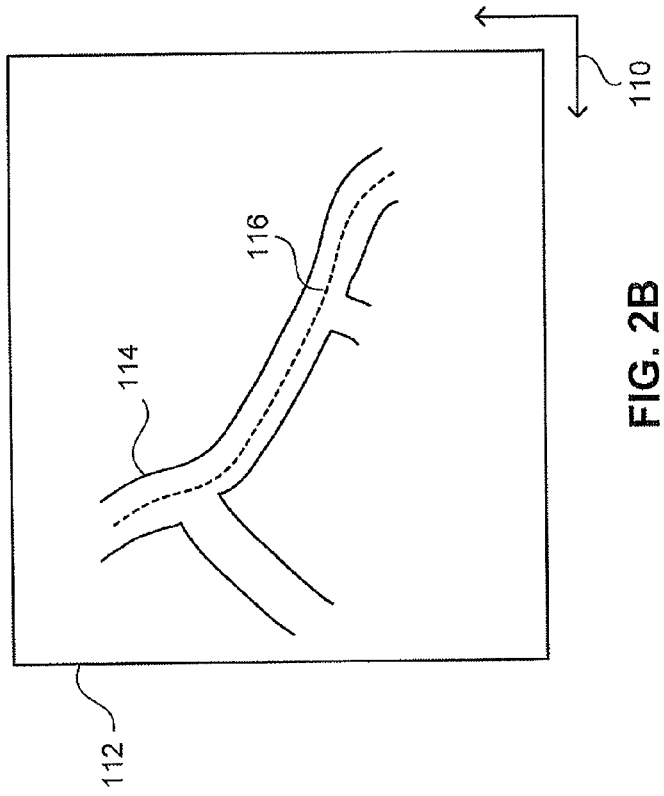
FIG. 2B is a schematic illustration of a 2D image 112 of the volume of interest.
Figure 2C:
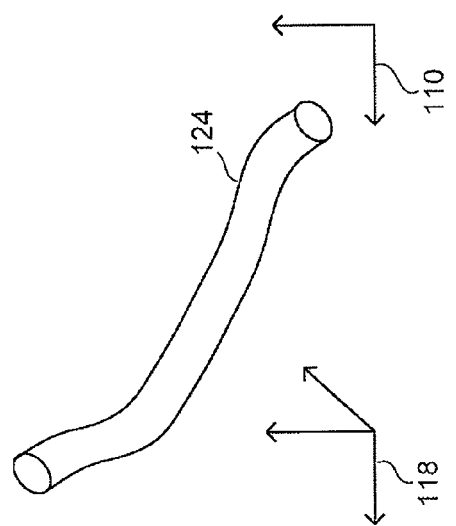
FIG. 2C is a schematic illustration of estimated volumetric model 124 determined from trace 122 (FIG. 2A) and 2D representation 114 (FIG. 2B) of the tubular organ.
Figure 2A:
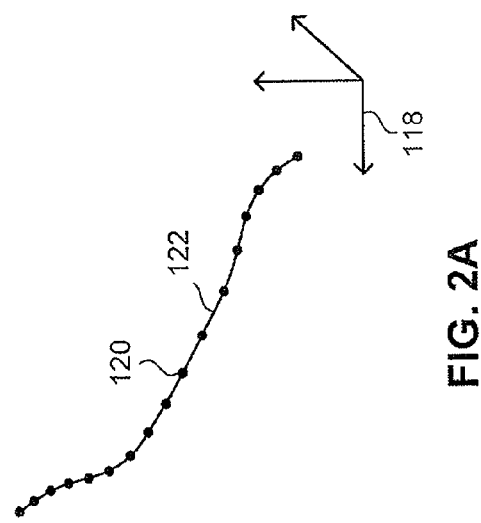
FIG. 2A is a schematic illustration of a trace 122 of a medical device (not shown) in accordance with the disclosed technique.

Reference is now made to FIGS. 2A, 2B and 2C. FIG. 2A is a schematic illustration of a trace 122 of a medical device (not shown) in accordance with the disclosed technique. Trace 122 is constructed from a plurality of MPS points, such as MPS point 120, representing the locations of the MPS sensor, fitted on the medical device, acquired when the medical device moves along the tubular organ (i.e., pushed forward or pulled back). These points are represented as coordinates in MPS coordinate system 118. FIG. 2B is a schematic illustration of a 2D image 112 of the volume of interest. 2D image 112 includes a 2D representation 114 of the tubular organ, and the trajectory 116 of the medical device inside this tubular organ. 2D image 112 is associated with 2D coordinate system 110. When the system according to the disclosed technique, uses an X-ray imager to obtain 2D image 112, it is desirable to inject the tubular organ with a dye to increase the apparentness of 2D representation 114 of the tubular organ in image 112. Since MPS coordinate system 118 is registered with 2D coordinate system 110, each of the MPS points, such as MPS point 120, has a corresponding point in 2D coordinate system 110. Using image processing techniques, such as segmentation or edge detection, the system determines the width of 2D representation 114 of the tubular organ for each MPS point. The system uses this width, together with trace 122 of the medical device (i.e., not necessarily the centerline of the tubular organ), to determine an estimated volumetric model of the tubular organ. For example, the width of 2D representation 114 of the tubular organ, at each MPS point, determines the diameter of a circle encircling that point. FIG. 2C is a schematic illustration of estimated volumetric model 124 determined from trace 122 (FIG. 2A) and 2D representation 114 (FIG. 2B) of the tubular organ. Estimated volumetric model 124 is associated with MPS coordinate system 118 and with 2D coordinate system 110.

Figure 3:
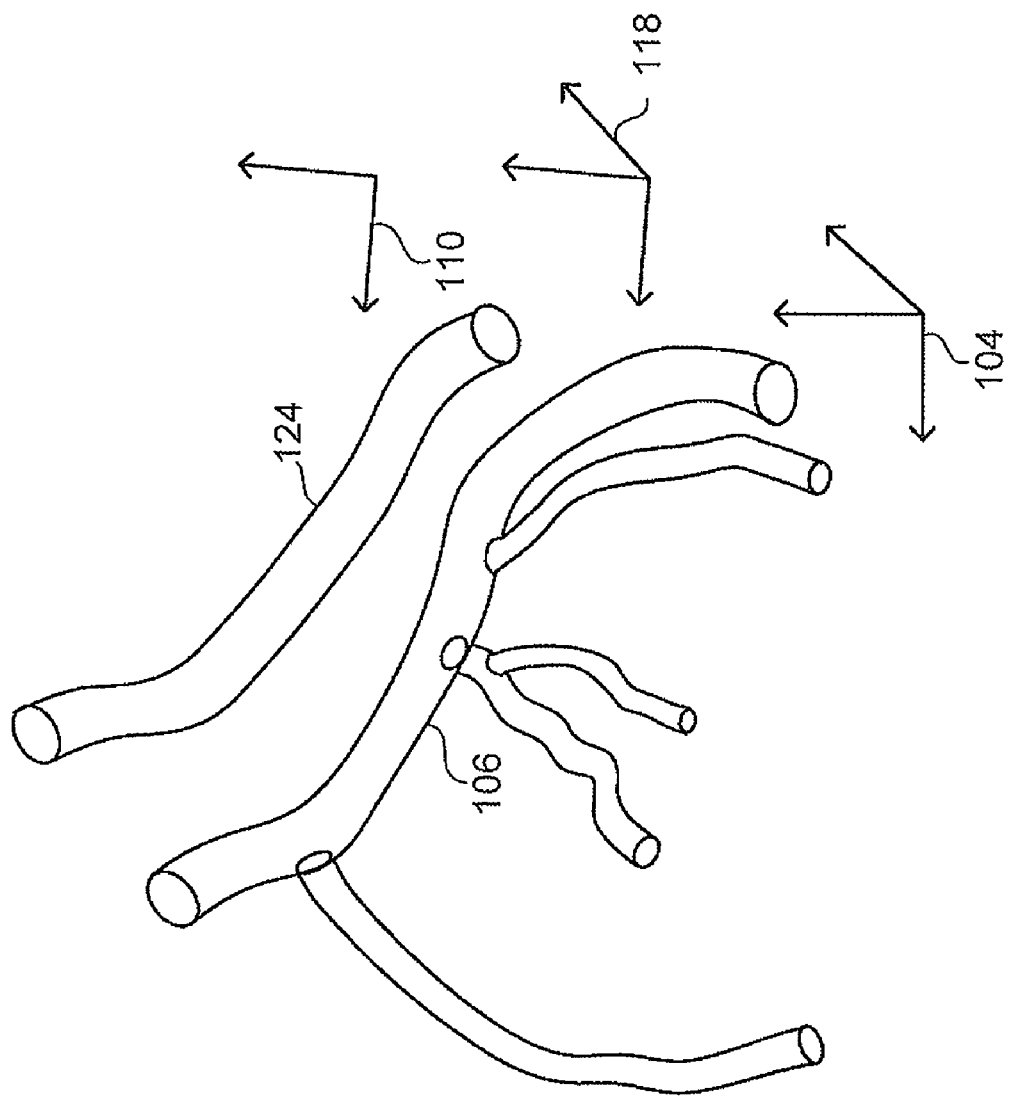
FIG. 3 is a schematic illustration of a registration process in accordance with the disclosed technique.

Reference is now made to FIG. 3 which is a schematic illustration of a registration process in accordance with the disclosed technique. In FIG. 3, the system registers MPS coordinate system 118 with 3D coordinate system 104, for example, by matching extracted 3D model 106 with estimated volumetric model 124. Consequent to this registration, 2D coordinate system 110 is also registered with coordinate system 104. Thus, each point, in each one of coordinate systems 110, 118 and 104, has a corresponding point in each of the other coordinate systems. This registration, between coordinate systems 110, 118 and 104, enables superimposing MPS points of interest, at their respective locations on the 3D image. For example, the 3D pre-acquired image may now serve, for example, as a roadmap for the medical staff, during medical procedures (e.g., treating structural heart disease, deployment of percutaneous valves, ablation, mapping, drug delivery, ICD/CRT lead placement, deploying a stent and other PCI procedures, surgery, biopsy). On this 3D reference roadmap, the system superimposes the 3D trace of the medical device within the tubular organ. This registration further enables superimposing points of interest included in the 3D image, at their respective location on the 2D image. As a further example, the 3D image model of the tubular organ may be projected on the 2D image. Thus, the projected 3D image may serve as a virtual dye, instead of injecting a fluoroscopic dye to the tubular organ prior to obtaining the 2D image.

Figure 4:
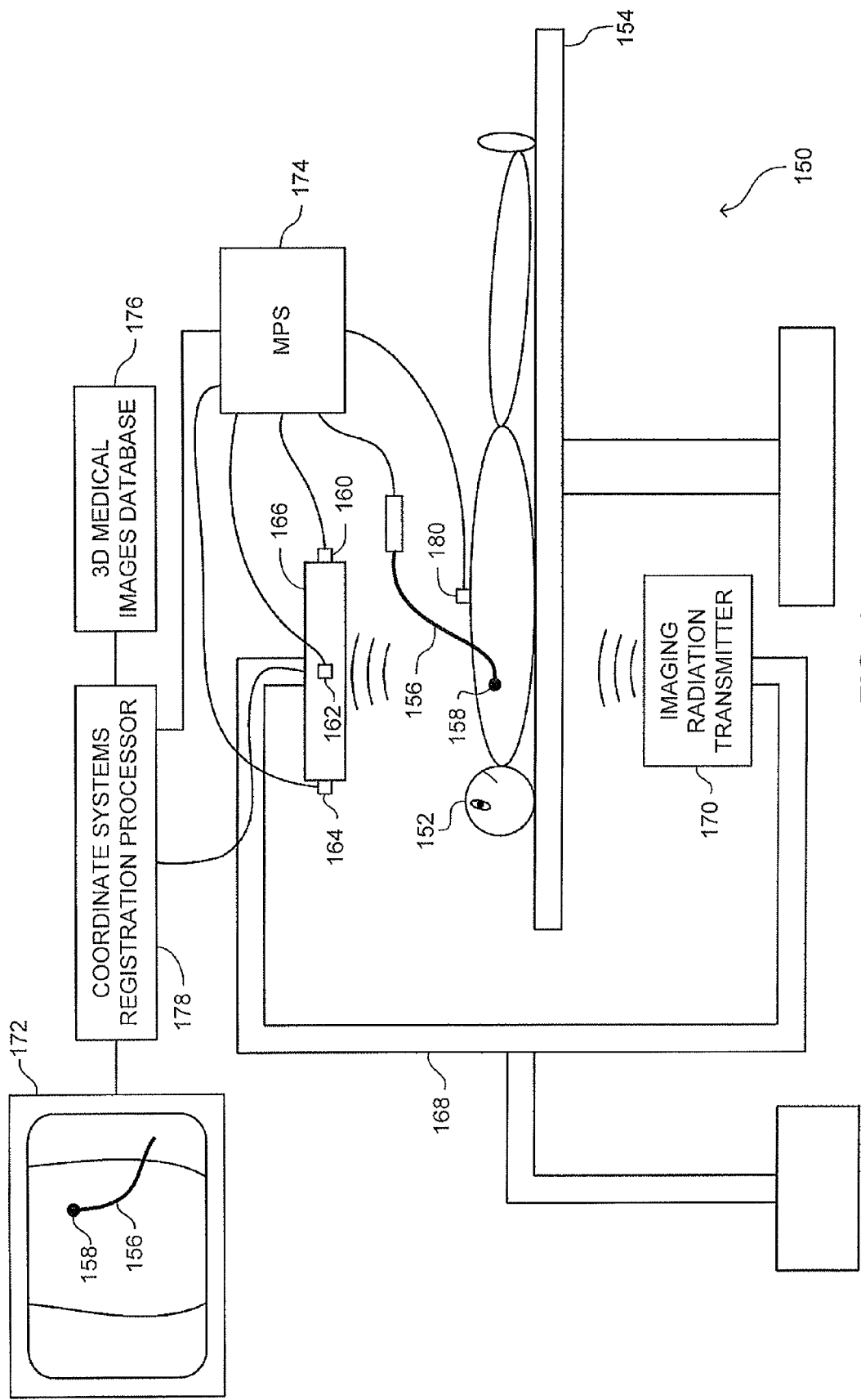
FIG. 4 is a schematic illustration of a system for registering a 3D coordinate system with an MPS coordinate system and with a 2D coordinate system, constructed and operative in accordance with another embodiment of the disclosed technique.

Reference is now made to FIG. 4, which is a schematic illustration of a system, generally referenced 150, for registering a 3D coordinate system with an MPS coordinate system and with a 2D coordinate system, constructed and operative in accordance with another embodiment of the disclosed technique. System 150 includes medical imaging system 168, a Medical Positioning System (MPS) 174, a 3D medical images database 176, a registration processor 178, a catheter 156, a display unit 172 and a table 154. Medical imaging system 168 includes an imaging radiation transmitter 170 and an imaging radiation detector 166. Medical positioning system 174 includes MPS transmitters 160, 162 and 164, attached to imaging radiation detector 166, patient reference position sensor 180 and MPS sensor 158.

Display unit 172 is coupled with coordinate systems registration processor 178. Coordinate systems registration processor 178 is further coupled with 3D medical images database 176, with MPS 174 and with imaging radiation detector 166. MPS sensor 158 is fitted on the distal end catheter 156. MPS transmitters 160, 162 and 164 are mechanically coupled with imaging radiation detector 166.

The 3D pre-acquired medical images, stored in 3D medical images database 176, are associated with a 3D coordinate system. The images acquired by medical imaging system 168 are associated with a 2D coordinate system. MPS 174 is associated with an MPS coordinate system. As mentioned above, since MPS transmitters 160, 162 and 164 are mechanically coupled to imaging radiation detector 166, the MPS coordinate system is registered with the 2D coordinate system. However, when MPS transmitters 160, 162 and 164 are not mechanically coupled with imaging radiation detector 166, the MPS coordinate system may be registered with the 2D coordinate system by placing an MPS sensor, at the 2D image space as a fiducial mark, at pre-determined positions and acquiring a 2D image of the MPS sensor at these locations. MPS 174 determines the location of the MPS sensor in the MPS coordinate system. Registration processor 178 determines the position of the MPS sensor in a plurality of 2D images and registers the 2D coordinate system with the MPS coordinate system.

A member of the medical staff inserts catheter 156 in to a patient 152, lying on table 154 and subjected to a treatment, and navigates the catheter, inside a tubular organ toward a volume of interest (e.g., the cardiovascular system). MPS transmitters 160, 162 and 164 transmit magnetic fields which are mutually orthogonal, corresponding to axes of the MPS coordinate system. MPS sensor 158 detects the magnetic fields generated by MPS transmitters 160, 162 and 164. The detected signals are related to the positions of distal end 158, in the MPS coordinate system, for example, by the Biot Savart law. Medical positioning system 174 obtains a trace of catheter 156 within a tubular organ, situated within the volume of interest. MPS 174 provides this trace to registration processor 178.

Imaging radiation transmitter 170 transmits radiation that passes through patient 152. This radiation, detected by imaging radiation detector 166, is a 2D projection of the anatomy of a volume of interest of patient 152. Imaging radiation detector 166 provides the 2D image to coordinate systems registration processor 178.

Using the MPS trace of catheter 156 and the 2D image, registration processor 178 constructs an estimated volumetric model of the tubular organ. 3D images database 176 provides coordinate systems registration processor 178 a 3D pre-acquired image of the same volume of interest of patient 156. Registration processor 178 extracts a 3D image model of the tubular organ. The two models are, for example, 3D triangulated mesh representations of the tubular organ. Registration processor 178 registers the 3D coordinate system with the MPS coordinate system, for example, by matching the two models.

Figure 5:
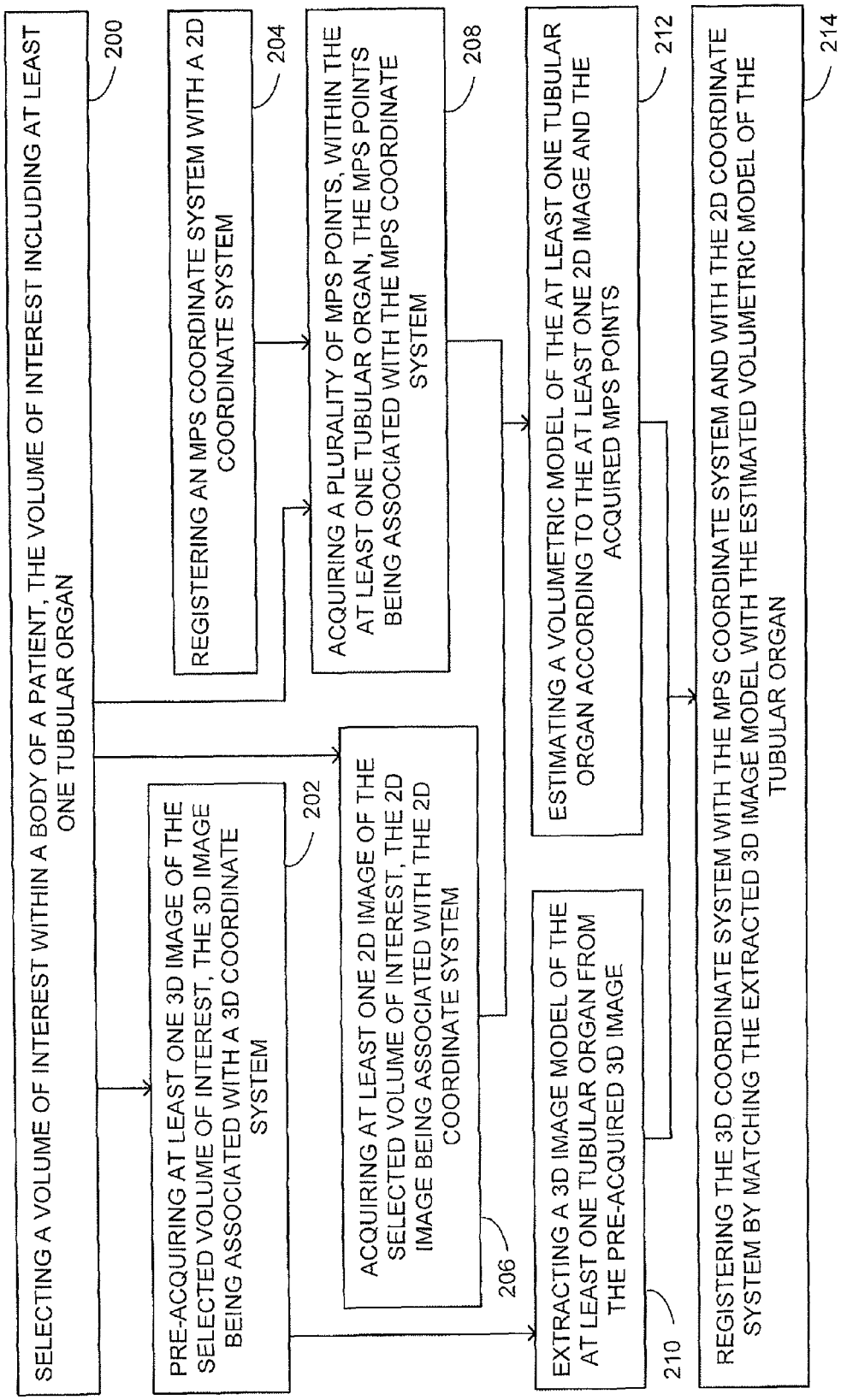
FIG. 5 is a schematic illustration of a method for registering a 3D coordinate system (e.g., of a pre-acquired volumetric image) with a 3D MPS coordinate system and with a 2D coordinate system (e.g. of a real-time image), operative in accordance with a further embodiment of the disclosed technique.

Reference is now made to FIG. 5, which is a schematic illustration of a method for registering a 3D coordinate system (e.g., of a pre-acquired volumetric image) with a 3D MPS coordinate system and with a 2D coordinate system (e.g. of a real-time image), operative in accordance with a further embodiment of the disclosed technique. In procedure 200, a volume of interest is selected. The volume of interest includes at least one tubular organ. After procedure 200 the method proceeds to procedures 202, 206 and 208.

In procedure 202, a 3D image of the selected volume of interest is pre-acquired. The 3D image is associated with a 3D coordinate system. This 3D image may be, for example, an MRI image, a PET image, a 3D reconstructed Ultrasound image, and the like. The pre-acquired 3D image is stored in a database. With reference to FIG. 1A, image 100 is an exemplary 3D image. With reference to FIG. 4, 3D medical image database 176 stores the 3D pre-acquired image. After procedure 202 the method proceeds to procedure 210.

In procedure 204, an MPS coordinate system is registered with a 2D coordinate system. This registration is achieved, for example, by mechanically coupling the MPS transmitters to the imaging system. Alternatively, for example, an MPS sensor is placed in the 2D image space as a fiducial mark, at pre-determined positions and 2D images of the MPS sensor are acquired at these locations. MPS 174 determines the location of the MP sensor in the MPS coordinate system. Registration processor 178 determines positions of MPS sensor in the 2D image and registers the 2D coordinate system with the MPS coordinate system. Consequent to this registration, each point in the MPS coordinate system has a corresponding point in the 2D coordinate system. With reference to FIG. 4, the MPS coordinate system is registered with the 2D coordinate system by mechanically coupling MPS transmitters 160, 162 and 164 to imaging radiation detector 166. After procedure 204 the method proceeds to procedure 208.

In procedure 206, at least one 2D real-time medical image is acquired. This 2D real-time medical image is, for example, an X-ray image, of a projection of a volume of interest in a body of a patient. The 2D real-time image is acquired, for example, during a medical procedure involving the use of a medical device, such as a catheter. With reference to FIG. 4, 2D medical imaging system 168 acquires at least one 2D real-time medical image. With reference to FIG. 2B, image 112 is, for example, a 2D real-time medical image. After procedure 206 the method proceeds to procedure 212.

In procedure 208, a plurality of MPS points, within at least one tubular organ, are acquired in real-time, the tubular organ being within the selected volume of interest. These MPS points are associated with the MPS coordinate system. The MPS points are acquired with a catheter, fitted with an MPS sensor, inserted into the tubular organ. The MPS points are acquired during the insertion of the catheter or during a manual or automatic pullback of the catheter. These MPS points form a trace of the trajectory of the catheter within the tubular organ. With reference to FIG. 4, MPS 174 acquires a plurality of MPS points, within the tubular organ. MPS 174 acquires these points with MPS sensor 158 fitted on catheter 156. With reference to FIG. 2A, trace 122 is formed from a plurality of MPS points such as point 120. After procedure 208 the method proceeds to procedure 212.

In procedure 210, at least one 3D image model of the at least one tubular organ is extracted from the pre-acquired 3D image. This 3D image model is, for example, a 3D triangulated mesh representation of the tubular organ. The 3D image model of the tubular organ is extracted for example by segmenting the 3D pre-acquired image. With reference to FIGS. 1A, 1B and 4, registration processor 178 (FIG. 4) extracts a 3D image model, such as 3D image model 106 (FIG. 1B), from a 3D pre-acquired image, such as 3D pre-acquired image 100 (FIG. 1A). The 3D pre-acquired image is stored in a 3D medical image database 176 (FIG. 4). After procedure 210 the method proceeds to procedure 214.

In procedure 212, a volumetric model of the at least one tubular organ is estimated according to the at least one 2D image and the acquired MPS points. This volumetric model of the tubular organ is estimated by detecting the border points of the tubular organ, for each point in the at least one 2D image, corresponding to an MPS point. These border points determine the constraints of a closed curve generated around each point on the at least on 2D image (e.g., the circumference of the closed curve must include these border points). In the case wherein one 2D image, of the tubular organ, was acquired from one perspective, the closed curve is a circle. The diameter of that circle is the distance between the detected 2D borders of the tubular organ. When, for example, two 2D images of the tubular organ, were acquired from two different perspectives, the refined contour will have the shape of an ellipse. In the case wherein more than two 2D images were acquired, the shape of the closed curve changes accordingly. The estimated volumetric model is also represented as a 3D triangulated mesh. It is noted that the MPS point need not be at the center of the closed curve. With reference to FIGS. 2A, 2B, 2C and 4, registration processor 178 estimates a volumetric model of the tubular organ such as volumetric model 124 (FIG. 2C). Registration processor 178 estimates this volumetric model form at least one 2D image such as 2D image 112 (FIG. 2B) and a plurality of MPS points such as MPS point 120 (FIG. 2A). After procedure 212 the method proceeds to procedure 214.

In procedure 214, the 3D coordinate system is registered with the MPS coordinate system and with the 2D coordinate system, by matching the extracted 3D image model with the estimated volumetric model of the tubular organ. This registration is performed, for example, by matching the 3D representations of the two models, thus achieving registration with a high degree of accuracy (i.e., since a volumetric model represents the tubular organ with a higher degree of accuracy, than a simple trace of the trajectory of the MPS sensor within the tubular organ). With reference to FIG. 4, registration processor 178 registers the MPS coordinate system with the 3D coordinate system and with the 2D coordinate system.

It is noted that the system and the method described in conjunction with FIG. 4 and FIG. 5, relate to the case wherein the 3D pre-acquired image, the MPS model and the 2D image are static. However, the disclosed technique is readily extended to the case where the 3D and 2D images change with time, for example, as a result of respiration and cardiac motion due to the cyclic motion of the heart and lungs. A cardiac cycle is defined as the time between two subsequent heart contractions, and the respiratory cycle is defined as the time between two subsequent lung contractions. It is noted that a time changing 3D or 2D image, is composed of a plurality of static 3D or 2D images respectively, each visually representing the organ at a different state. Furthermore, it is noted that for each static 3D or 2D image there is an organ activity state (i.e., a point within the cardiac or respiratory cycles) associated therewith.

As mentioned above, during acquisition of the MPS points, the inspected tubular organ may move (e.g., due to the cardiac and respiratory motion). This motion affects the MPS sensor readings (e.g., position and orientation). Therefore, while acquiring MPS point readings, and 3D and 2D time changing images, the system simultaneously acquires organ timing signals of the organ (e.g., the heart, the lungs). These organ timing signals represent the activity states in the cycle of the organ. Accordingly, each MPS point, and each of the static 3D and 2D images, (i.e., the static 3D and 2D images composing the time changing 3D and 2D images), is associated with a respective organ timing signal phase (i.e., an activity state of the organ), for example, an electrocardiogram (ECG) signal. Consequently, each MPS point is associated with a respective static 3D and 2D image, according to the respective organ timing signals thereof. A plurality of MPS points, acquired during the same activity state, define a unique 3D trajectory of the MPS sensor associated with the respective activity state. Thus, the unique 3D trajectory, of the MPS sensor, is also defined for each static 3D and 2D image.

Figure 6A:
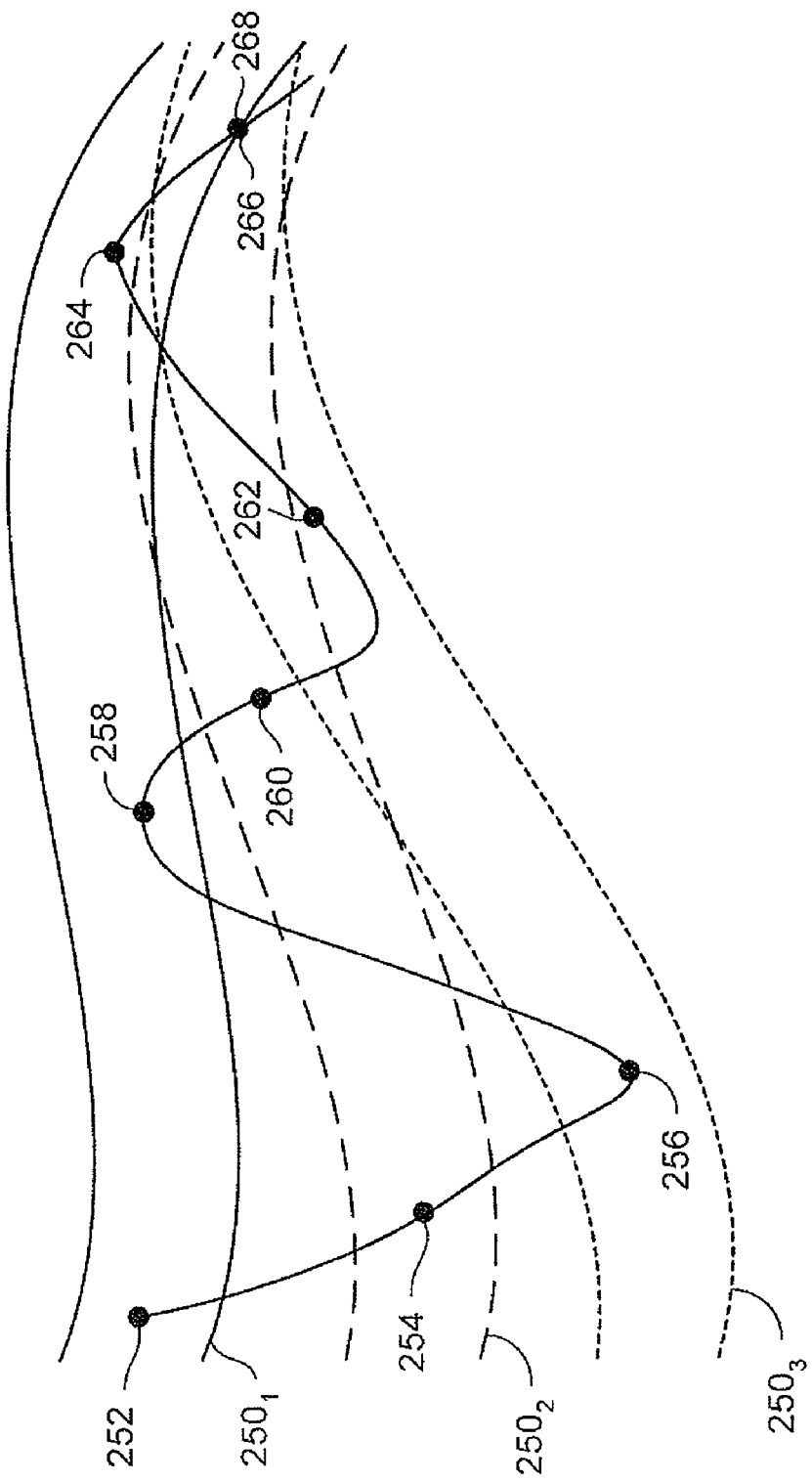
FIGS. 6A and 6B are schematic illustrations of three 2D images, of tubular organ in the body of a patient, acquired at three different activity states of the organ, and the MPS points acquired during these three different activity states, in accordance with another embodiment of the disclosed technique.
Figure 6B:
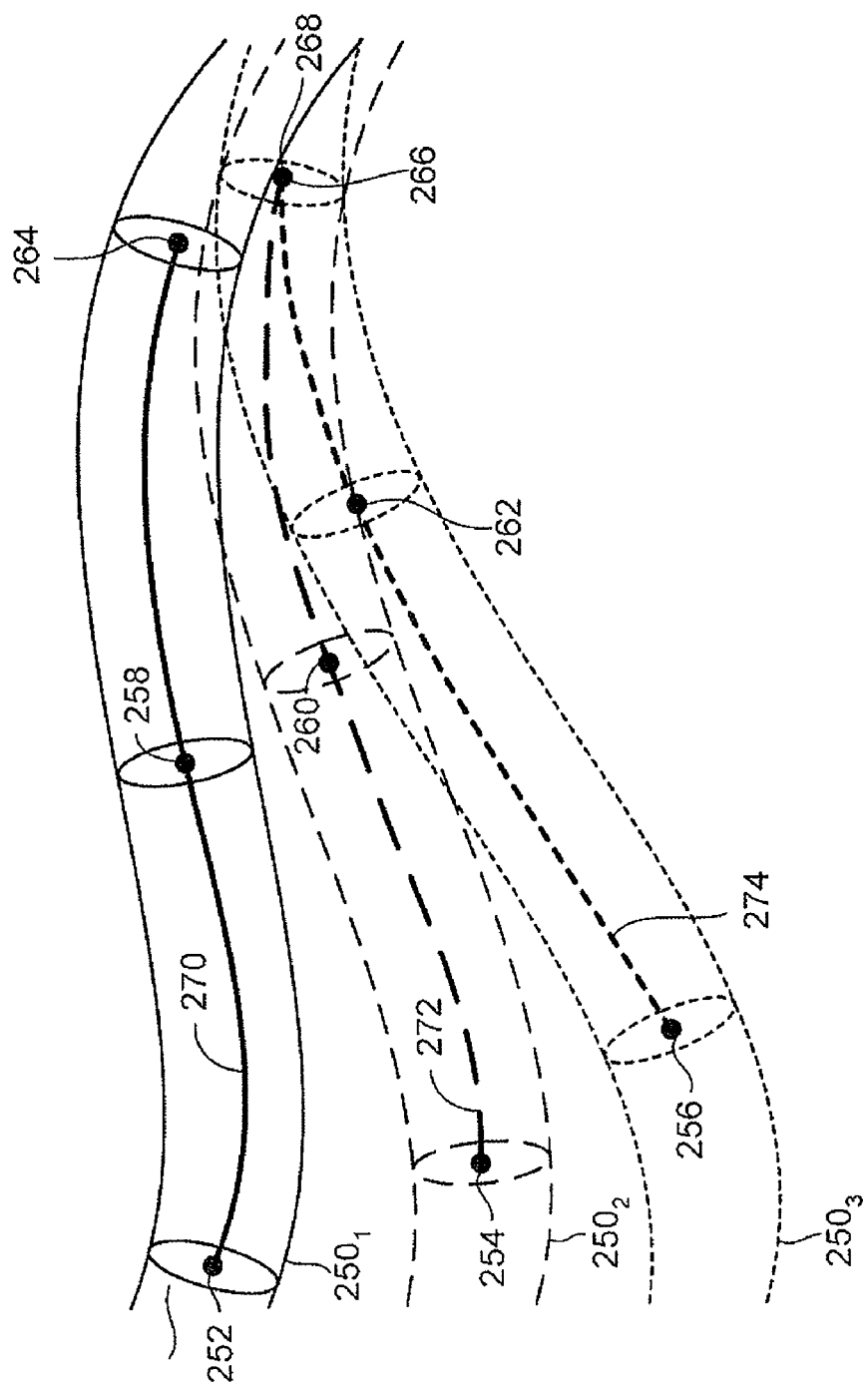

Reference is now made to FIGS. 6A and 6B, which are schematic illustrations of three 2D images, of a tubular organ in the body of a patient, acquired at three different activity states of the organ, and the MPS points acquired during these three different activity states, in accordance with another embodiment of the disclosed technique. The first image of the organ, designated $250_1$, was acquired at a first activity state $T_1$. The second image of the organ, designated $250_2$, was acquired at a second activity state $T_2$. The third image of the organ, designated $250_3$, was acquired at a third activity state $T_3$. During activity state $T_1$, MPS points 252, 258 and 264 were acquired. During activity state $T_2$, MPS points 254, 260 and 266 were acquired. During activity state $T_3$, MPS points 256, 262 and 268 were acquired. Thus, referring to FIG. 6B, centerline 270 is the projection of the catheter 3D trajectory on image $250_1$. Centerline 272 is the projection of the catheter 3D trajectory on image $250_2$. Centerline 274 is the projection of the catheter 3D trajectory on image $250_3$. Consequent to associating the MPS points, the 2D images and the 3D images with a respective organ timing signal, the system according to the disclosed technique can superimpose the unique 3D trajectory on the respective static 3D or 2D image (i.e., the image associated with the same activity state). Furthermore, only a trajectory, a 2D image and a 3D image, associated with a single organ timing signal reading of interest can be considered. For example, referring back to FIG. 6B, only image $250_3$, with centerline 274 is considered. A patient reference sensor, such as patient reference sensor 180 (FIG. 4), compensates respiration artifacts as well as patient movements during the acquisition of the 3D, 2D images or the organ timing signal.

It will be appreciated by persons skilled in the art that the disclosed technique is not limited to what has been particularly shown and described hereinabove. Rather the scope of the disclosed technique is defined only by the claims, which follow.

The invention claimed is:
1. Method for registering a three dimensional (3D) coordinate system with a Medical Positioning System (MPS) coordinate system, and with a two dimensional (2D) coordinate system, the method comprising the procedure of:
    acquiring at least one 2D image of a volume of interest, said volume of interest including at least one organ within the body of a patient, said 2D image being associated with said 2D coordinate system;
    acquiring a plurality of MPS points within said at least one organ, said MPS points being associated with said MPS coordinate system, said MPS coordinate system being registered with said 2D coordinate system;

extracting a 3D image model of said at least one organ from at least one pre-acquired 3D image of said volume of interest, said at least one pre-acquired 3D image and said 3D image model being associated with said 3D coordinate system;

estimating a volumetric model of said at least one organ according to said at least one 2D image and said acquired MPS points; and registering said 3D coordinate system with said MPS coordinate system and with said 2D coordinate system by matching said extracted 3D image model with said estimated volumetric model, wherein said 2D coordinate system, said 3D coordinate system, and said MPS coordinate system are three different coordinate systems.

2. The method according to claim 1, further comprising a preliminary procedure of selecting said volume of interest.

3. The method according to claim 1, further comprising the procedure of pre-acquiring said at least one pre-acquired 3D image, before performing said procedure of extracting.

4. The method according to claim 1, further comprising the procedure of registering said 2D coordinate system with said MPS coordinate system, prior to acquiring said at least one 2D image and said MPS points.

5. The method according to claim 4, wherein said procedure of registering is performed between said MPS, said at least one 2D image and said pre-acquired 3D image, all associated with the same respective organ timing signal activity state.

6. The method according to claim 1, wherein each of said MPS points, each of said at least one 2D image, and each of said at least one 3D pre-acquired image are all associated with a respective organ timing signal activity state.

7. The method according to claim 6, wherein said organ timing signal represents an activity state in a cycle of said at least one organ.

8. The method according to claim 6, wherein said organ timing signal is an electrocardiogram signal.

9. The method according to claim 1, wherein said volumetric model is estimated by detecting the border points of said at least one organ for each point in said at least one 2D image corresponding to an MPS point.

10. The method according to claim 9, wherein said border points determine the constraints of a closed curve generated around each point on the at least one 2D image.

11. The method according to claim 1, wherein said extracted 3D image model and said estimated volumetric model are 3D triangulated mesh representations of said at least one organ.

12. System for registering a three dimensional (3D) coordinate system with a Medical Positioning System (MPS) coordinate system and with a two dimensional (2D) coordinate system, the system including a medical imaging system for acquiring at least one 2D image of a volume of interest within the body of a patient, and a 3D medical images database for storing at least one pre-acquired 3D image of said volume of interest, the at least one 2D image being associated with the 2D coordinate system, the pre-acquired 3D images being associated with the 3D coordinate system, the volume of interest including at least one organ, the system comprising:

an MPS associated with said MPS coordinate system, said MPS comprising:
a plurality of MPS transmitters for generating an electromagnetic field; and
an MPS sensor for acquiring a plurality of MPS points within said at least one organ, said MPS sensor being associated with said MPS coordinate system, said MPS coordinate system being registered with said 2D coordinate system; and a coordinate systems registration processor coupled with said MPS, with said medical imaging system, and with said 3D medical images database, said coordinate systems registration processor extracting a 3D image model of said at least one organ from at least one pre-acquired 3D image of said organ, said coordinate systems registration processor estimating a volumetric model of said at least one organ, according to said at least one 2D image and according to said MPS points, said coordinate systems registration processor registering said 3D coordinate system with said MPS coordinate system and with said 2D coordinate system by matching said 3D image model with said volumetric model, wherein said 2D coordinate system, said 3D coordinate system, and said MPS coordinate system are three different coordinate systems.

13. The system according to claim 12, wherein each of said MPS points, said at least one 2D image, and said at least one pre-acquired 3D image are all associated with a respective organ timing signal activity state of said organ.

14. The system according to claim 13, wherein said organ timing signal represents an activity state in a cycle of said at least one organ.

15. The system according to claim 13, wherein said organ timing signal is respective of the heart of said patient.

16. The system according to claim 13, wherein said organ timing signal is respective of the lungs of said patient.

17. The system according to claim 13, wherein said coordinate systems registration processor registers said 3D coordinate system with said 2D coordinate system and with said MPS coordinate system according to said MPS points, said at least one 2D image, and said pre-acquired 3D image, each associated with the same respective organ timing signal activity state.

18. The system according to claim 12, wherein said coordinate systems registration processor estimates said volumetric model by detecting the border points of said at least one organ, for each point in said at least one 2D image corresponding to an MPS point, according to the registration between said 2D coordinate system and said MPS coordinate system.

19. The system according to claim 18, wherein said border points determine the constraints of a closed curve generated around each MPS point.

20. The system according to claim 12, wherein said extracted 3D image model and said estimated volumetric model are 3D triangulated mesh representations of said at least one organ.

21. The system according to claim 12, wherein said MPS transmitters are in close proximity with said medical imaging system and move therewith, thereby maintaining registration between said MPS coordinate system and said 2D coordinate system.

22. The system according to claim 12, wherein said medical imaging system includes an imaging radiation transmitter and an imaging radiation detector.

23. The system according to claim 22, wherein said MPS transmitters are in close proximity with said imaging radiation detector and move therewith, thereby maintaining registration between said MPS coordinate system and said 2D coordinate system.

24. The system according to claim 12, wherein said MPS sensor is attached to the tip of a catheter inserted into said organ.

25. The system according to claim 12, wherein said MPS further includes a patient reference position sensor coupled with said body, said patient reference position sensor enabling said MPS to compensate for movement of said patient.

26. System for registering a three dimensional (3D) coordinate system with a Medical Positioning System (MPS) coordinate system and with a two dimensional (2D) coordinate system, the system including a medical imaging system for acquiring at least one 2D image of a volume of interest within the body of a patient, and a 3D medical images database for storing at least one pre-acquired 3D image of said volume of interest, the at least one 2D image being associated with the 2D coordinate system, the pre-acquired 3D images being associated with the 3D coordinate system, the volume of interest including at least one tubular organ, the system comprising:

an MPS associated with said MPS coordinate system, said MPS comprising:

a plurality of MPS transmitters for generating an electromagnetic field; and an MPS sensor for acquiring a plurality of MPS points within said at least one tubular organ, said MPS sensor being associated with said MPS coordinate system, said MPS coordinate system being registered with said 2D coordinate system; and a coordinate systems registration processor coupled with said MPS, with said medical imaging system, and with said 3D medical images database, said coordinate systems registration processor extracting a 3D image model of said at least one tubular organ from at least one pre-acquired 3D image of said tubular organ, said coordinate systems registration processor estimating a volumetric model of said at least one tubular organ, according to said at least one 2D image and according to said MPS points, said coordinate systems registration processor registering said 3D coordinate system with said MPS coordinate system and with said 2D coordinate system by matching said 3D image model with said volumetric model, wherein said 2D coordinate system, said 3D coordinate system, and said MPS coordinate system are three different coordinate systems.

* * * * *